(12) United States Patent
Gebraad et al.

(10) Patent No.: US 8,901,181 B2
(45) Date of Patent: Dec. 2, 2014

(54) PARTICULATE, EXPANDABLE POLYMER, A METHOD FOR PREPARING THE SAME AS WELL AS THE USE THEREOF

(75) Inventors: Matthijs Gebraad, Oud Gastel (NL); Franciscus Petrus Antonius Kuijstermans, Sprundel (NL); Jan Noordegraaf, Wijchen (NL)

(73) Assignee: Synbra Technology B.V., Etten-Leur (NL)

( * ) Notice: Subject to any disclaimer, the term of this patent is extended or adjusted under 35 U.S.C. 154(b) by 205 days.

(21) Appl. No.: 13/640,934

(22) PCT Filed: Apr. 21, 2011

(86) PCT No.: PCT/NL2011/050273
§ 371 (c)(1),
(2), (4) Date: Nov. 15, 2012

(87) PCT Pub. No.: WO2011/133034
PCT Pub. Date: Oct. 27, 2011

(65) Prior Publication Data
US 2013/0087735 A1    Apr. 11, 2013

(30) Foreign Application Priority Data
Apr. 21, 2010   (NL) ..................................... 2004588

(51) Int. Cl.
*C08J 9/16*    (2006.01)
*E04B 1/76*   (2006.01)
*C08J 9/00*    (2006.01)

(52) U.S. Cl.
CPC ................ *E04B 1/76* (2013.01); *C08J 9/0066* (2013.01); *C08J 9/16* (2013.01); *C08J 2201/03* (2013.01)
USPC ................................ 521/56; 521/82; 521/146

(58) Field of Classification Search
CPC ........ C08J 9/0066; C08J 9/16; C08J 2201/03; E04B 1/76
USPC ............................................. 521/56, 82, 146
See application file for complete search history.

(56) References Cited

U.S. PATENT DOCUMENTS

| 6,130,265 A | 10/2000 | Glueck et al. |
| 6,340,713 B1 | 1/2002 | Glueck et al. |
| 2005/0112356 A1* | 5/2005 | Rynd et al. ................. 428/317.9 |
| 2005/0222370 A1* | 10/2005 | Freitag et al. ................. 528/167 |
| 2009/0062410 A1* | 3/2009 | Maurer et al. ................. 521/79 |
| 2012/0264836 A1* | 10/2012 | Felisari et al. ................. 521/79 |

FOREIGN PATENT DOCUMENTS

| EP | 1 486 530 A1 | 12/2004 |
| NL | 1023638 C2 | 12/2004 |
| WO | WO 2010/041936 A2 | 4/2010 |
| WO | WO2011042800 * | 4/2011 |

OTHER PUBLICATIONS

Notification Concerning Transmittal of International Preliminary Report on Patentability dated Nov. 8, 2012 and Written Opinion of the International Searching Authority for PCT/NL2011/050273.
International Search Report for PCT/NL2011/050273 dated Sep. 12, 2011.
Malvern Instruments, "Mastersizer 2000—Validation and 21 CFR compliance, Questions and Answers", Internet citation, Dec. 10, 2010, pp. 1-17, XP-002613684, Retrieved from the Internet: URL:http://www.malvern.com.cn/common/downloads/MRK447-02%20LR.pdf, (retrieved on Dec. 10, 2010), the whole document.
Wikipedia Internet Encyclopedia, "Particle size distribution", Wikipedia Internet Encyclopedia, Dec. 10, 2010, pp. 1-6, XP-002613685, (retrieved on Dec. 10, 2010), the whole document.
Wikipedia Internet Encyclopedia, "Normal distribution", Wikipedia Internet Encyclopedia, Dec. 10, 2010, pp. 1-22, XP-002613686, (retrieved on Dec. 10, 2010), the whole document.
Wikipedia Internet Encyclopedia, "Graphene", Wikipedia Internet Encyclopedia, Dec. 10, 2010, pp. 1-22, XP-002613687, (retrieved on Dec. 10, 2010), the whole document.
Wikipedia Internet Encyclopedia, "Carbon black", Wikipedia Internet Encyclopedia, Dec. 10, 2010, pp. 1-4, XP-002613688, (retrieved on Dec. 10, 2010), the whole document.
Wikipedia Internet Encyclopedia, "Graphite", Wikipedia Internet Encyclopedia, Dec. 10, 2010, pp. 1-9, XP-002613689, (retrieved on Dec. 10, 2010), the whole document.

* cited by examiner

*Primary Examiner* — Irina S Zemel
(74) *Attorney, Agent, or Firm* — Shumaker, Loop & Kendrick, LLP

(57) ABSTRACT

Particulate, expandable polymer which can be processed into a foam having a fine cell structure and a low density and which, in order to improve the thermal insulation value thereof, contains a carbon-based thermal insulation value-increasing material. A method for preparing particulate, expandable polymer as well as to a foam material obtained therewith.

13 Claims, 2 Drawing Sheets

US 8,901,181 B2

PARTICULATE, EXPANDABLE POLYMER, A METHOD FOR PREPARING THE SAME AS WELL AS THE USE THEREOF

CROSS-REFERENCE TO RELATED APPLICATION

This 35 U.S.C. §371 National Stage application claims priority to PCT/NL2011/050273 filed Apr. 21, 2011, which claims priority to NL2004588 filed Apr. 21, 2010, the entirety of each of which is incorporated by reference herein.

TECHNICAL FIELD AND BACKGROUND OF THE INVENTION

The present invention relates to particulate, expandable polymer which can be processed into a foam having a fine cell structure and a low density and which, in order to improve the thermal insulation value thereof, contains a carbon-based thermal-insulation-value-increasing material. The present invention further relates to a method for preparing particulate, expandable polymer as well as to a foam material obtained therewith.

From European patent EP 1 486 530 (corresponding to NL 1023638) in the name of the present applicant expandable polystyrene (EPS) is known in which active carbon is present in the polystyrene particles as a thermal-insulation-value-increasing material. The active carbon that is used has a particle size of <12 microns. A foam obtained by using such a thermal insulation value increasing-material complies with the fire-resistance requirements according to the B2 test, viz. DIN 4101 part 2.

From WO 2010/041936 in the name of the present applicant expandable polystyrene (EPS) is known in which active carbon exhibiting a specific particle distribution is used as a thermal insulation value-increasing material.

From U.S. Pat. No. 6,130,265 a method for preparing graphite-containing EPS is known in which an amount of 0.05-25 wt. % graphite, based on the amount of styrene polymer, is added.

From U.S. Pat. No. 6,340,713 a particulate, expandable polystyrene is known, which styrene polymer comprises 0.05-8 wt. % homogeneously distributed graphite particles having an average particle size of 1-50 µm.

A method for increasing the thermal insulation value of EPS is furthermore known per se from International patent application WO 00/43442, in which styrene polymer is melted in an extruder and mixed with at least a blowing agent and aluminium particles, which are mainly in the form of platelets, and jointly extruded, with the amount of aluminium particles being used being at most 6 wt. %, whereupon the extrudate is cooled and reduced into particles. Such polymers contain at least aluminium in the form of particles so as to improve the thermal insulation properties thereof, which aluminium particles are homogeneously distributed and incorporated as a material that reflects infrared radiation. The aluminium particles have a platelet-like shape, whose dimensions vary from 1 to 15 µm.

The starting material that is used for producing expandable polystyrene (EPS) can be obtained not only via the extrusion process as known from the aforesaid international patent application, but also via suspension polymerisation. The EPS granulate thus obtained is generally used as a starting material in the packaging industry and in the construction industry. The method for the further processing comprises a pre-foaming treatment, in which an amount of steam is passed through a layer of EPS granules in an expansion vessel, as a result of which the blowing agent present in the EPS granules, usually pentane, is evaporated and foaming of the granules takes place. After a storage period of approximately 4-48 hours, also referred to as "maturing", the thus pre-foamed granule is introduced into a mould, in which the granules are further expanded under the influence of steam. The mould used in that process is provided with small openings through which the blowing agent that is still present can escape whilst the granules fuse to the desired shape. The dimensions of said shape are in principle not bound by limitations, making it possible to produce blocks for use in the construction industry as well as packaging materials for food products and non-food products.

BRIEF SUMMARY OF THE INVENTION

It is an object of the present invention to provide a particulate, expandable polymer granule, which, after further processing, provides a foam having a sufficiently low thermal conduction coefficient that is desired in practice so as to thus obtain the intended thermal insulation properties.

Another aspect of the present invention is to provide a method for producing expandable polymer granule, wherein styrene polymers can be converted in the presence of one or more additional components into a material which, after foaming and moulding, has a higher thermal insulation value.

The invention as described in the introduction is characterised in that carbon having a particle size of <1 µm is present in the polymer particles as a thermal insulation value-increasing material.

By using such a type of carbon as a thermal insulation value-increasing material one or more aspects of the present invention are satisfied. A preferred value of 0.1 µm is given for the lower limit of the particle size. In particular, the present invention excludes the use of carbon black as a source of carbon.

It is particularly desirable for the D50 particle size to be at most 1 µm, more specifically for the D50 particle size to be at most 0.8 µm.

The D90 value and D50 value refer to the 90th and 50th percentage, respectively, meaning that 90% and 50% of the population, respectively, have a particle size below those values. The D10 (the maximum particle size of 10% of the population), D50 (the maximum particle size of half of the population) and D90 (the maximum particle size of 90% of the population) can be easily inferred from a cumulative distribution curve obtained with the aid of the Malvern Instruments products Mastersizer and Lasersizer, and these three values (D10, D50 and D90) can be used to characterise the particle size distribution in powder. In particular, the (D90–D10)/D50 ratio (also referred to as particle size distribution) provides a good indication of the spread of particle sizes contained in the powder.

In other words, the 10th percentage means that the particle size of 10% of the particles is smaller than or equal to this value, and that of 90% is thus larger.

In other words, the 50th percentage means that the particle size of 50% of the particles is smaller than or equal to this value, and that of 50% is thus larger. The D50 is preferably at most 1.0, in particular at most 0.8 µm.

In other words, the 90th percentage means that the particle size of 90% of the particles is smaller than or equal to this value, and that of 10% is thus larger.

The polymer that is applicable in the present invention is selected from the group comprising polystyrene, expanded polypropylene (EPP), expanded cellular polyethylene (EPE), polyphenylene oxide (PPO), polypropylene oxide and/or polylactic acid or a combination thereof.

Polylactic acid (PLA) is a collective name for polymers based on lactic acid monomers, the structure of the polylactic acid varying from completely amorphous to semi-crystalline or crystalline, depending on the composition. Polylactic acid can be produced for example from milk products, starch, flour and maize. Lactic acid is the monomer of which polylactic acid is composed, and this monomer occurs in two stereoisomers, viz. L-lactic acid and D-lactic acid. So polylactic acid contains a certain proportion of L-lactic acid monomers and a certain proportion of D-lactic acid monomers. The ratio of the L- and D-lactic acid monomers in polylactic acid determines the properties of the polylactic acid. In this context reference is also made to a D-value or D-content (percentage of D-lactic acid monomers). The polylactic acid that is currently commercially available has an L:D ratio ranging between 100:0 and 75:25; in other words, a D-content ranging between 0 and 25%, or between 0 and 0.25.

An example of the further processing of PLA granulate is as follows. After impregnation with for example 6-8% $CO_2$, PLA granulate is foamed at a pressure of for example 20 bar. Then the PLA is once again impregnated as a foam with for example 6% $CO_2$ and moulded in a mould at a steam pressure ranging between 0.2 and 0.5 bar. This way the moulded part is obtained in the same way as discussed above in relation to EPS granules.

PLA granules are produced using an extruder having a so-called cutter head. To this end solid PLA is introduced into an extruder and melted. Then the melted PLA is pressed through a mould, for example a so-called underwater granulator, and the PLA granules are formed via the cutter head. It is also possible for liquid PLA to be directly supplied to the extruder in an in-line polymerisation process, so that it does not have to be melted first. Preferably a double-screw extruder is used as the extruder. In an extruder the polylactic acid or the mixture of polylactic acid and optionally one or more other biodegradable polymers with optionally one or more chain extender(s), nucleating agent(s) and lubricant(s) can be processed into granules. Such particulate polylactic acid is also described in PCT/NL2008/000109 by the present inventors.

After the extrusion of the polylactic acid a blowing agent is added by impregnating the PLA granules to obtain expandable PLA (EPLA). Examples of blowing agents that could be used are $CO_2$, MTBE, nitrogen, air, (iso)pentane, propane, butane and the like, or one or more combinations thereof. The first way is for the polylactic acid to be formed into particles, for example by means of extrusion, which particles are subsequently made expandable by impregnating them with a blowing agent. The second way is for the polylactic acid to be mixed with a blowing agent, which is subsequently directly formed into expandable particles, for example by means of extrusion.

The present inventors assume that, in order to obtain a certain thermal insulation value, in particular graphene or exfoliated graphite, which former material is to be interpreted as a layer with a thickness of one atom of sp2-bound carbon atoms that are arranged in a honeycomb-like flat crystal lattice, can be used in a smaller amount than the thermal insulation value-increasing materials usually used according to the state of the art, in particular in comparison with other carbon sources such as graphite or active carbon. Additional experiments have shown that the material referred to as graphene in the present invention may also be regarded as exfoliated graphite with a particle size of 0.1-0.8 µm. Therefore the graphene used in the description is to be understood to be exfoliated graphite with a particle size of 0.1-0.8 µm.

Such a reduction in the amount of added thermal insulation value-increasing material has a favourable effect on the ultimate colour of EPS, which material is originally white. The aforementioned additives lead to a somewhat grey "discolouration" of the originally white EPS.

In a special embodiment it is in particular desirable for exfoliated graphite having an aspect ratio of ≥10:1, in particular ≥100:1, to be used. Such a layered structure will have a particularly good influence on raising the thermal insulation value.

It is particularly desirable for the amount of carbon to amount to 1-15 wt. %, based on the polymer, preferably for the amount of carbon to amount to 2-8 wt. %, based on the polymer.

It will be clear that in certain embodiments it will be preferable for one or more additional thermal insulation value-increasing materials to be present in the particulate expandable polymer, selected from the group comprising graphite, carbon black, aluminium powder, $Al(OH)_3$, $Mg(OH)_2$ and $Al_2O_3$, iron, zinc, copper and alloys thereof.

To obtain a good flame-retardant effect it is preferable for the polymer to contain a flame retardant, in particular hexabromocyclododecane (HBCD).

If the product obtained must meet stringent fire-resistance requirements it is desirable for one or more additional flame retardants selected from the group comprising hexabromocyclododecane (HBCD), dicumyl peroxide, brominated polymer compounds, in particular polystyrene compounds, and 2,3-dimethyl-2,3-diphenylbutane, to be added in an amount ranging between 1.0 and 8 wt. %, based on the amount of polymer. It is also possible to add as a processing aid a phosphorus compound selected from the group comprising polyphosphonates, diphenylphosphonate, bisphenol A-bis (diphenylphosphate) and resorcinol aromatic polyphosphate compounds, or a combination thereof.

The exfoliated graphite referred to in the present application can be obtained by subjecting a carbon source to mechanical shearing forces, in particular by subjecting graphite to such a treatment. An example of such a treatment is the extrusion process in which graphite is in an extruder subjected to major shearing forces, causing the graphite to be converted into flat carbon platelets, in particular exfoliated graphite. In certain embodiments the carbon source can be added as a masterbatch, or directly as a powdered material, which powdered material has been pretreated to obtain the desired particle size as specified in the claims.

The present invention also relates to a method for producing particulate expandable polymer, in which styrene polymer is fed to an extruder and is mixed with at least a blowing agent, carbon source and one or more processing aids as specified in the included subclaims, and is subsequently extruded, cooled and further reduced into particles.

In a special embodiment the present invention further relates to a method for producing particulate expandable polymer, in which monomer, blowing agent, thermal insulation value-increasing material and one or more processing aids as specified in the included subclaims are subjected to a polymerisation reaction in a reactor. It is particularly desirable for the density of EPS, as a preferred polymer, to be in the range of 850-1050 kg/m³.

The present invention further relates to a polymer foam material based on particulate expandable polymer as described above, the polymer foam material preferably being used for thermal-insulation purposes, for example in the construction industry, but also as a packaging material in the food and non-food industries.

The present invention will be explained in more detail below with reference to a number of examples below, in which connection it should be noted, however, that the present invention is by no means limited to such examples.

The particle size distribution of various products was determined, as indicated in the following table.

DETAILED DESCRIPTION OF THE INVENTION

| Product, type of carbon | D10 | D50 | D90 |
|---|---|---|---|
| Commercially available EPS moulded pad, graphite | 2 | 4 | 12 |
| EPS moulded part marketed by the applicant, active carbon | 2 | 5 | 31 |
| Present invention, graphene micronised graphite | 0.4 | 0.8 | 1 |

It is particularly desirable for the D50 value to be at most 1 μm, in particular at most 0.8 μm.

A number of mechanical properties were determined of a number of commercially available products and a burning test was carried out. The results clearly show that the addition of graphene or exfoliated graphite has a favourable effect on the thermal conductivity of the ultimate, EPS-based foam moulded part.

passed to a cooling extruder having temperatures of between 60° C. and 150° C., which resulted in a grey XPS plate.

The foam obtained had a density of 35 kg/m$^3$. The thermal insulation value of the foam was found to be 31.1 mW/mK in the case of the masterbatch, and 30.9 mW/mK in the case of the concentrate, and both products passed the DIN4102 B2 burning test.

Figure 2:
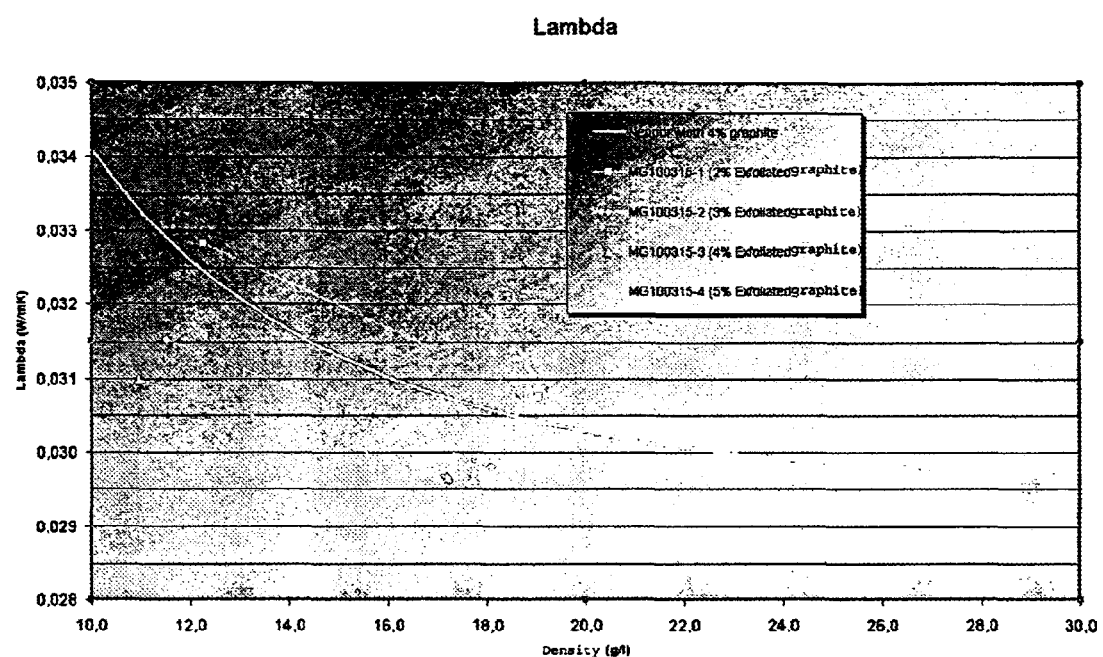
FIG. 2 is a graphical representation of the density vs the lambda value of various EPS materials.

The included FIG. 2 is a graphical representation of a number of measurements, with the horizontal axis showing the density and the vertical axis the lambda value (W/mK). From this representation it is clear that a higher lambda value is obtained for the commercially available Neopor containing 4 wt. % graphite (predominantly having a particle size of >1 μm, in particular 1-50 μm) at the same density [than] for EPS to which exfoliated graphite (particle size of between 0.1 and 0.8 μm) has been added in a certain percentage by weight.

Determination of the Particle Size of Exfoliated Graphite

An amount of 10 g of grey foamed EPS was dissolved in 28 ml of toluene. The slurry was analysed. The residue was dispersed ultrasonically with the addition of toluene and analysed with an ALV instrument. A Malvern Zetasizer was used to measure the particle size. Further dilution with toluene followed if necessary. Zetasizer GMA is a so-called Dynamic Light Scattering instrument having the following specifications: Correlator: ALV5000/60X0, External Goniometer Correlator: ALV-125, Detector: ALV/SO SIPD Single Photon Detector with Static and Dynamic Enhancer ALV Laser Fiber optics: Cobolt Samba 300 DPSS Laser, Wavelength: 532 nm, 300 mW Power Temperature Control: Static Thermal Bath: Haake F8-C35. No special standards were used; the instrument measures the Brownian motion of the particles and the Einstein-Stokes equation was used to convert the measured values into particle sizes. It is assumed that

| Material | Density (g/l) | Lambda (W/mK) | Density (g/l) | Pressure strength (kPa) | Density (g/l) | Crushing strength (kPa) | Burning test DIN4102-1 B2 |
|---|---|---|---|---|---|---|---|
| 4% active carbon, μm | 19.70 | .0315 | 19.7 | 110.8 | 20.5 | 231.0 | Nt |
| 6% active carbon, μm | 18.3 | 0.0307 | 17.9 | 99.2 | 18.0 | 176.4 | Nt |
| 3% carbon black | 16.8 | 0.0316 | 16.1 | 89.1 | 17.1 | 126.0 | Pass |
| 9% carbon black | 17.9 | 0.0306 | 17.6 | 87.3 | 17.6 | 171.2 | Pass |
| Neopor 2300 5% | 17.0 | 0.0308 | Nt | Nt | Nt | Nt | Pass |
| graphite | 11.0 | 0.0333 | Nt | Nt | Nt | Nt | Pass |
| Neopor 2300 4% | 19.1 | 0.0308 | 18.7 | 105.1 | 19.0 | 139.8 | Pass |
| graphite | 12.3 | 0.0238 | 18.7 | 48.8 | Nt | Nt | Pass |
| (2% graphene) | 18.1 | 0.0298 | 12.1 | 99.0 | 18.1 | 150.7 | Pass |
| (2% graphene) | 11.5 | 0.0315 | 1.6 | 44.3 | Nt | Nt | Pass |
| (3% graphene) | 17.2 | 0.0297 | 11.3 | 94.8 | 17.9 | 129.9 | Pass |
| (3% graphene) | 11.0 | 0.0310 | 17.7 | 40.9 | Nt | Nt | Pass |
| (4% graphene) | 17.8 | 0.0296 | 11.0 | 82.9 | 17.5 | 131.7 | Pass |
| (4% graphene) | 30.0 | 0.0300 | 17.2 | Nt | Nt | Nt | Pass with slow burning |
| (5% graphene) | | | | | | | Pass self extinguishing |
| PLA 3% graphene | | | | | | | |
| PLA 3% graphene + 6% resorcinol aromatic polyphosphate | 30.0 | 0.0302 | Nt | Nt | Nt | Nt | |

Nt = Not tested

The EPS 710F, 0.7-1.0 mm particle size, Synbra Technology, containing 5.5% pentane was melted in a twin-screw extruder having a capacity of 125 kg/hour with the addition of P1000 polyethylene (Baker Huigjes) 0.1% and graphene masterbatch, a graphene concentrate, respectively, as a result of which 4% graphene was effectively introduced into the polystyrene. The temperature of the extruder is preferably between 150° C. and 230° C.; in this embodiment 0.8% extra pentane was added as a blowing agent. The mixture was the solvent is water and that the particles are by approximation spherical. The radius was measured.

| All in % (m/m) | r50 | r80 | d50 = 2*r50 | d80 = 2*r80 |
|---|---|---|---|---|
| | Particle radius | | Diameter, microns | |
| Natural graphite G11/95 | 352 | 169540 | 0.7 | 339 |
| Natural graphite G12/95 | 350 | 45818 | 0.7 | 92 |
| Graphite Kropfmühl UF2 96/97 | 351 | 75141 | 0.7 | 150 |

-continued

| All in % (m/m) | r50 Particle radius | r80 | d50 = 2*r50 Diameter, microns | d80 = 2*r80 |
|---|---|---|---|---|
| Particle extracted from EPS with graphene dispersion, addition of 4% graphene | 127 | 423 | 0.25 | 0.85 |
| Particle extracted from EPS graphene masterbarch, addition of 3% graphene] | 95 | 200 | 0.19 | 0.4 |

Figure 1:
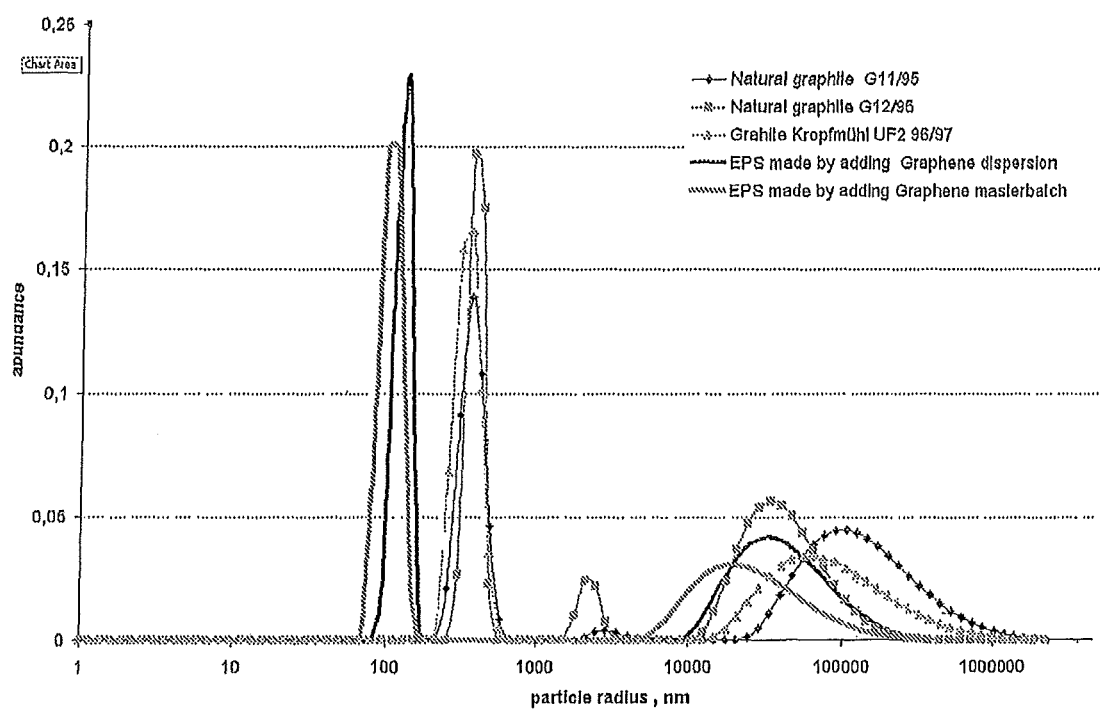
FIG. 1 shows the measuring results obtained for various carbon sources.

It will be clear that the graphite reference material has a larger particle size and agglomerates, which was also visibly observable. The exfoliated graphite contained in EPS shows far finer particles, on average 3 to 5 times smaller than the particle size of graphite. Although some small particles formed agglomerates, they were less prominently present than in the case of graphite. The included FIG. 1 is a graphical representation of the results.

The invention claimed is:

1. A particulate, expandable polymer which can be processed into a foam having a fine cell structure and a low density to improve the thermal insulation value thereof, particulate, expandable polymer comprising:
   a polymer; and
   a carbon-based thermal insulation value-increasing material that is an exfoliated graphite having a particle size in the range of 0.1-0.8 µm with an aspect ratio of the exfoliated graphite being greater than or equal to 10:1, wherein:
   the exfoliated graphite is obtained by mechanical shearing of graphite.

2. The particulate, expandable polymer according to claim 1, wherein the polymer is selected from polystyrene, expanded polypropylene (EPP), expanded cellular polyethylene (EPE), polyphenylene oxide (PPO), polypropylene oxide and polylactic acid, or a combination thereof.

3. The particulate, expandable polymer according to claim 1, wherein the aspect ratio of the exfoliated graphite is greater than or equal to 100:1.

4. The particulate, expandable polymer according to claim 1, wherein the amount of carbon-based thermal insulation value-increasing material is 1-15 wt % based on the amount of particulate, expandable polymer.

5. The particulate, expandable polymer according to claim 4, wherein the amount of carbon-based thermal insulation value-increasing material is 2-8 wt %.

6. The particulate, expandable polymer according to claim 1, wherein a lower limit of the particle size of the carbon-based thermal insulation value-increasing material is greater than 0.1 µm.

7. A method for preparing a particulate, expandable polymer comprising:
   (a) introducing a polymer into an extruder,
   (b) mixing the polymer with at least a blowing agent, one or more processing aids, and a carbon-based thermal insulation value-increasing material that is an exfoliated graphite having a particle size in the range of 0.1-0.8 µm with an aspect ratio of the exfoliated graphite being greater than or equal to 10:1, the exfoliated graphite obtained by mechanical shearing of graphite to form a mixture,
   (c) extruding the mixture of step (b), and
   (d) cooling and reducing the extrudate of step (c) into particles.

8. A method for preparing a particulate, expandable polymer comprising:
   (a) polymerizing a monomer, blowing agent, one or more processing aids, and a carbon-based thermal insulation value-increasing material that is an exfoliated graphite having a particle size in the range of 0.1-0.8 µm with an aspect ratio of the exfoliated graphite being greater than or equal to 10:1, the exfoliated graphite obtained by mechanical shearing of graphite, to form a polymerized mixture, and
   (b) cooling and reducing the polymerized mixture of step (a) into particles.

9. The method according to claim 7, wherein one or more thermal-insulation-value-increasing agent(s) selected from the group consisting of graphite, carbon black, aluminium powder, $Al(OH)_3$, $Mg(OH)_2$, $Al_2O_3$, iron, zinc, copper and alloys thereof is/are additionally added as (a) processing aid(s).

10. The method according to claim 7, wherein one or more flame retardants selected from the group consisting of bromide compounds and brominated polymer compounds is/are added as (a) processing aid(s).

11. The method according to claim 10, wherein hexabromocyclododecane (HBCD) and/or brominated polystyrene compounds is/are added.

12. The method according to claim 7, wherein a phosphorus compound selected from the group consisting of polyphosphonates, diphenylphosphonate, bisfenol A-bis(diphenylphosphate) and resorcinol aromatic polyphosphate compounds or a combination thereof is added as a processing aid.

13. A polymer foam material based on the particulate, expandable polymer according to claim 1.

* * * * *